United States Patent
Droz et al.

(10) Patent No.: US 9,059,649 B1
(45) Date of Patent: Jun. 16, 2015

(54) DYNAMIC MOTOR POSITION DETERMINATION

(71) Applicant: Google Inc., Mountain View, CA (US)

(72) Inventors: Pierre-yves Droz, Mountain View, CA (US); Gaetan Pennecot, San Francisco, CA (US)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 13/784,412

(22) Filed: Mar. 4, 2013

(51) Int. Cl.
*H02K 29/08* (2006.01)
*H02P 6/16* (2006.01)

(52) U.S. Cl.
CPC .................................... *H02P 6/16* (2013.01)

(58) Field of Classification Search
USPC ................. 318/653, 400.38, 640, 400.4, 562; 324/207.24, 67, 207.2, 326
See application file for complete search history.

(56) References Cited

U.S. PATENT DOCUMENTS

| | | | |
|---|---|---|---|
| 3,790,277 A | 2/1974 | Hogan | |
| 4,529,934 A | 7/1985 | Heinrich | |
| 4,700,301 A | 10/1987 | Dyke | |
| 4,709,195 A | 11/1987 | Hellekson et al. | |
| 5,202,742 A | 4/1993 | Frank et al. | |
| 5,469,033 A | 11/1995 | Huang | |
| 5,644,225 A * | 7/1997 | Alfors et al. | ................... 324/202 |
| 5,796,194 A | 8/1998 | Archer et al. | |
| 5,866,962 A | 2/1999 | Kim | |
| 6,049,182 A | 4/2000 | Nakatani et al. | |
| 6,051,943 A | 4/2000 | Rabin et al. | |
| 7,089,114 B1 | 8/2006 | Huang | |
| 7,183,734 B2 | 2/2007 | Lassen | |
| 7,248,342 B1 | 7/2007 | Degnan | |
| 7,255,275 B2 | 8/2007 | Gurevich et al. | |
| 7,969,558 B2 | 6/2011 | Hall | |
| 2005/0001580 A1 * | 1/2005 | Dorner | ..................... 318/653 |
| 2006/0066282 A1 | 3/2006 | Soeda | |
| 2008/0106259 A1 * | 5/2008 | Stuve | ..................... 324/207.24 |

OTHER PUBLICATIONS

Ruben, ECEE4638 Control Systems Lab Manual, University of Colorado Electrical, Computer, and Energy Engineering, Aug. 21, 2011, http://ecee.colorado.edu/shalom/ecee4638/ecee4638manual.pdf.

* cited by examiner

*Primary Examiner* — Shawki S Ismail
*Assistant Examiner* — Jorge L Carrasquillo
(74) *Attorney, Agent, or Firm* — McDonnell Boehnen Hulbert & Berghoff LLP

(57) ABSTRACT

Methods and systems are provided for determining a position of a rotor in a motor at a particular time based on the non-uniform (imperfect) angular position of coils in the motor. In one example, a method may be implemented for light detection and ranging (LIDAR) applications. The method may involve rotating a rotor of a motor at a substantially constant angular velocity, receiving from Hall-effect sensors in the motor data representative of which coils in the plurality of coils are active during the substantially constant rotation of the rotor, correlating a reference angular position of the rotor, receiving subsequent data from the Hall-effect sensors indicating which coils are active at a particular time, correlating the particular time to a position of the rotor in the substantially constant rotation of the rotor, and determining an angular position of the rotor at the particular time.

20 Claims, 5 Drawing Sheets

DYNAMIC MOTOR POSITION DETERMINATION

BACKGROUND

Unless otherwise indicated herein, the materials described in this section are not prior art to the claims in this application and are not admitted to be prior art by inclusion in this section.

Light distance and ranging (LIDAR) is an optical remote sensing technology that may be utilized to acquire information on a surrounding environment. The acquired information may include distances and textures of objects in the surrounding environment. A LIDAR device may be configured to illuminate the objects with light, detect light reflected from the objects, and determine information on the objects based on the reflected light. The LIDAR device may use ultraviolet, visible, or infrared light to illuminate and acquire information on a variety of different types of objects, such as metallic and non-metallic items, geological formations, and even atmospheric elements.

In operation, the LIDAR device may be configured to perform a periodic sweep of the surrounding environment to locate and identify objects in the environment. In this case, the LIDAR device may include a rotating mirror configured to direct light towards and detect light from objects in the environment within a range of angles. Detection of the reflected light may be used to determine a distance and texture of an object, and an angular position of the mirror when light is directed and detected may be used to determine a direction of the object.

SUMMARY

In one aspect, a method is provided. The method may involve rotating a rotor of a motor at a substantially constant angular velocity. The motor includes a plurality of coils and a plurality of Hall-effect sensors. The method may further involve receiving from the Hall-effect sensors data representative of which coils in the plurality of coils are active during the substantially constant rotation of the rotor. The data from the Hall-effect sensors has a non-uniform time sequence reflective of non-uniform angular positions of the coils. The method may further involve correlating a reference angular position of the rotor to a reference time in the non-uniform time sequence, and receiving subsequent data from the Hall-effect sensors. The subsequent data includes data representative of which coils are active at a particular time. The method may further involve correlating the particular time to a position in the non-uniform time sequence based on the subsequent data, and determining an angular position of the rotor at the particular time based on the position in the non-uniform time sequence relative to the reference time.

In another aspect, a device is provided. The device may include a motor having a rotor, a plurality of coils, and a plurality of Hall-effect sensors. The device may also include an electronic circuit configured to rotate the rotor at a substantially constant angular velocity, and receive from the Hall-effect sensors data representative of which coils in the plurality of coils are active during the substantially constant rotation of the rotor. The data from the Hall-effect sensors has a non-uniform time sequence reflective of non-uniform angular positions of the coils. The electronic circuit is also configured to correlate a reference angular position of the rotor to a reference time in the non-uniform time sequence, and receive subsequent data from the Hall-effect sensors. The subsequent data includes data representative of which coils are active at a particular time. The electronic circuit is also configured to correlate the particular time to a position in the non-uniform time sequence based on the subsequent data, and determine an angular position of the rotor at the particular time based on the position in the non-uniform time sequence relative to the reference time.

In a further aspect, a non-transitory computer-readable medium having instructions stored thereon is provided. The instructions may be executable by a computing device to cause the computing device to perform functions including rotating a rotor of a motor at a substantially constant angular velocity. The motor includes a plurality of coils and a plurality of Hall-effect sensors. The functions may further include receiving from the Hall-effect sensors data representative of which coils in the plurality of coils are active during the substantially constant rotation of the rotor. The data from the Hall-effect sensors has a non-uniform time sequence reflective of non-uniform angular positions of the coils. The functions may further include correlating a reference angular position of the rotor to a reference time in the non-uniform time sequence, and receiving subsequent data from the Hall-effect sensors. The subsequent data includes data representative of which coils are active at a particular time. The functions may further include correlating the particular time to a position in the non-uniform time sequence based on the subsequent data, and determining an angular position of the rotor at the particular time based on the position in the non-uniform time sequence relative to the reference time.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

As indicated above, a LIDAR device may include a rotating mirror configured to steer light that is transmitted to and received from objects in the environment. The rotating mirror may include a mirror coupled to a motor such that the mirror may rotate about a rotational axis of the motor. In one example, the motor may be a three-phase brushless motor with a rotating permanent magnet (rotor) and a stationary armature (stator) having a plurality of conductive coils spaced substantially equally apart. A three-phase current may then be provided to the coils to produce a sequence of magnetic field configurations to cause the rotor to spin.

Figure 1A:
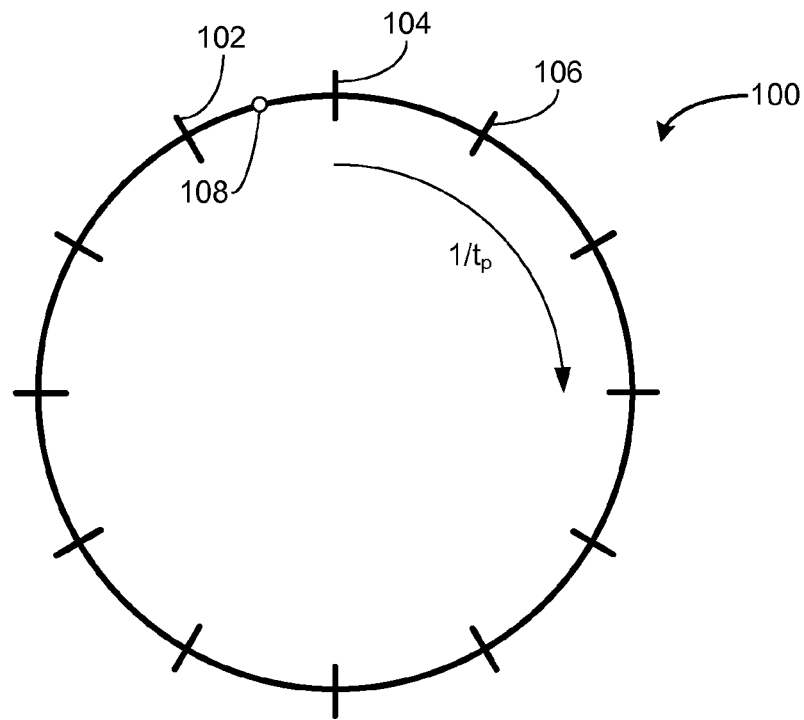
FIG. 1A shows a first example representation of motor positions in a motor, in accordance with an example embodiment.

FIG. 1A shows a first example representation of motor positions 100 in a motor, in accordance with an example embodiment. As shown, the motor positions 100 may include motor positions 102, 104, and 106. In one case, the motor positions may represent detected positions of the rotor. For instance, the motor may include a plurality of Hall-effect sensors, configured to detect a magnetic field of the rotor, and provide an output indicating a presence of the rotor. In this case, each of the plurality of Hall-effect sensors may be coupled to one of the plurality of conductive coils spaced substantially equally apart along the stator of the motor. Each Hall-effect sensor in this case may be physically positioned on or immediately adjacent to a corresponding conductive coil. As such, each of the motor positions 100 shown in FIG. 1A may correspond to a location of a Hall-effect sensor coupled to a conductive coil. Accordingly, an output from one of the plurality Hall-effect sensors may indicate the presence of the rotor at the one of the plurality of Hall-effect sensors, and may reflect a position of the rotor in the motor.

In another case, the motor positions 100 may reflect rotor positions calculated from different combinations of the plurality of conductive coils being activated. Additional descriptions of the motor positions are provided in the following sections. Also shown in FIG. 1A, the rotor of the motor may be rotating at a constant rate of $1/t_p$, where $t_p$ represents the rotational period the rotor.

Figure 1B:
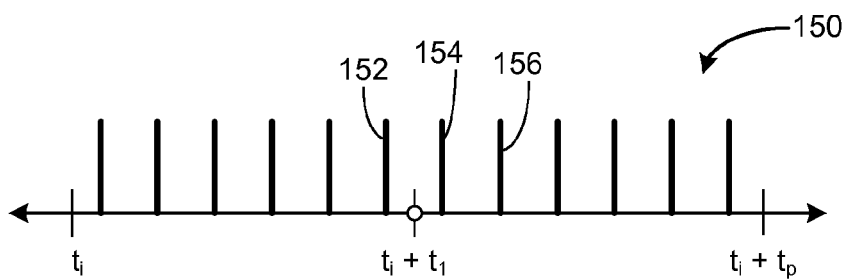
FIG. 1B shows a first example time sequence representative of motor positions over time, in accordance with an example embodiment.

FIG. 1B shows a first example time sequence 150 representative of motor positions over time, in accordance with an example embodiment. In one case, the time sequence 150 may be representative of rotor positions as detected by the plurality of Hall-effect sensors, during a full rotation of the rotor, starting at an initial time $t_i$, and ending at a time $t_i+t_p$, where $t_p$ is the rotational period of the rotor. As suggested above, the rotor positions may alternatively be calculated from combinations of coil activations. In either case, a signal transition 152 in the time sequence 150 may indicate when the rotor moved by the motor position 102. Similarly, signal transitions 154 and 156 in the time sequence 150 may indicate when the rotor moved by motor positions 104 and 156, respectively.

In a perfectly manufactured motor, each of the plurality of conductive coils may be spaced evenly apart, such that each of the plurality of Hall-effect sensors is spaced evenly apart. In this case, if the rotor is rotating at a constant speed, the time taken for the rotor to rotate from one motor position to a next motor position may be calculated as the rotational period $t_p$ divided by the number of rotor positions. As shown in FIG. 1A, the illustrative representation of motor positions 100 may include 12 evenly spaced rotor positions, with an angular distance of 30 degrees between each motor position. As such, the time taken for the rotor to rotate from a motor position to a next rotor position may be $t_p/12$.

In the case of a perfectly manufactured motor, the time sequence 150 may be based on to determine an exact location of the rotor at any particular time. For instance, a time $t_i+t_1$ may occur half way between when signal transitions 152 and 154 occur in the time sequence 150. Thus, a position 108 of the rotor may be determined as half way between motor positions 102 and 104, as shown in FIG. 1A. Further, a motor position may be designated as a reference position, and a relative angle of the rotor may be determined. For example, motor position 104 may be designated as a reference rotor position and a relative angle of the rotor at position 108 may be calculated as 360−30/2=345 degrees.

Figure 2A:
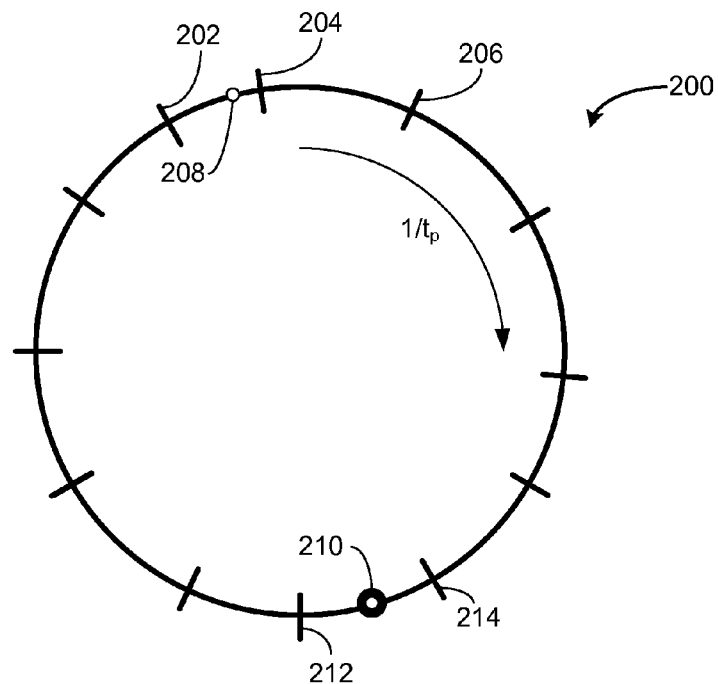
FIG. 2A shows a second example representation of motor positions in an imperfect motor, in accordance with an example embodiment.

In reality, however, motors may be imperfect, such that the conductive coils, and accordingly, the Hall-effect sensors coupled to the conductive coils, may be spaced only substantially evenly apart. FIG. 2A shows a second example representation of motor positions 200 in an imperfect motor, in accordance with an example embodiment. As shown, motor positions 200 may include example rotor positions 208 and 210, and motor positions 202, 204, 206, 212, and 214. The motor having the motor positions 200 may be an imperfect, real-world version of the motor described above in connection to FIG. 1A. In other words, the motor positions 200 may unevenly spaced. For instance, an angular distance between motor position 202 and motor position 204 may be less than 30 degrees, and an angular distance between motor position 204 and motor position 206 may be greater than 30 degrees.

In this case, rather than approximating positions of the rotor based on an assumption that motor positions in the motor are spaced evenly apart, as illustrated in FIGS. 1A and 1B, imperfections of the motor in the form of unequally spaced conductive coils may be applied to generate a "fingerprint" of the motor. The generated fingerprint of the motor may then be based upon to determine a relative position of the rotor at a particular time with improved precision and accuracy.

Figure 2B:
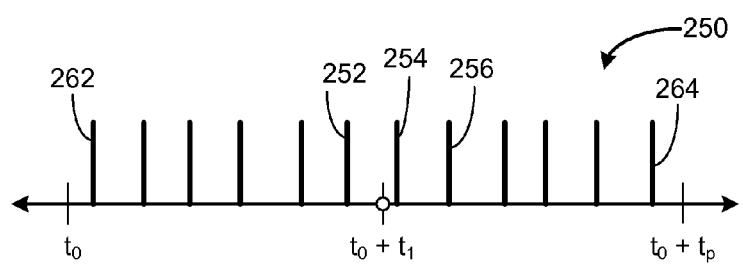
FIG. 2B shows a second example time sequence representative of motor positions over time, in accordance with an example embodiment.

In one example, the fingerprint of the motor may be in the form of a time sequence representative of rotor positions over time. FIG. 2B shows a second example time sequence 250 having signal transitions over a time frame of $t_0$ to $t_0+t_p$, and representative of positions of a rotor making a full rotation at a substantially constant rate of $1/t_p$. The signal transitions in the time sequence 250 of FIG. 2B may be reflective of the rotor moving by each of the motor position 200 shown in FIG. 2A. For example, signal transitions 252, 254, 256, 262, and 264 may be indicative of when the rotor moved past motor positions 202, 204, 206, 212, and 214, respectively. Reflective of the uneven spaces between motor positions 202 and 204, and motor positions 204 and 206, for example, the time difference between signal transitions 252 and 254 may be shorter than the time difference between signal transitions 245 and 256. As such, the time sequence 250 may be uniquely representative of the imperfect motor as represented by rotor motor positions 200, and may therefore be a fingerprint of the motor.

Once a fingerprint in the form of a time sequence of rotor positions has been generated for a motor, a reference position may be determined in the fingerprint and an angular position of the rotor relative to the reference position may be determined for any particular time during the rotation of the rotor in the motor. Example motor device components and methods for dynamically determining motor positions as suggested above are further discussed in the following sections.

Figure 3:
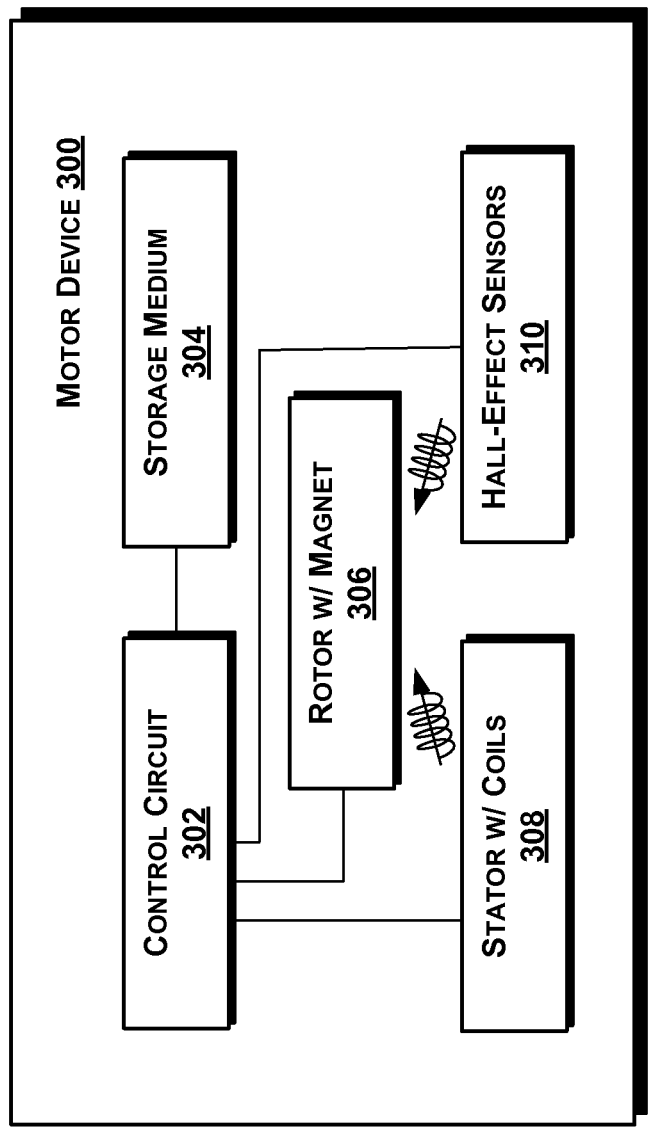
FIG. 3 is a simplified block diagram of a motor device, in accordance with an example embodiment.

FIG. 3 is a simplified block diagram of a motor device 300, in accordance with an example embodiment. As shown, the motor device 300 may include a control circuit 302, a storage medium 304, a rotor 306, a stator 308, and a plurality of Hall-effect sensors 310. In one example, the rotor 306 may include a permanent magnet, and the stator 308 may include a plurality of conductive coils, as discussed previously. Each of the components in the motor device 300 may be in communication with other components in the motor device 300 either directly or via the control circuit 302. As shown, the rotor 306 may be in communication with the stator 308 and the Hall-effect sensors 310 through changes in magnetic fields. For instance, magnetic fields generated by current flowing through the conductive coils of the stator may cause the rotor 306 to rotate, and a magnetic field of the permanent magnet of the rotor 306 may trigger the Hall-effect sensors 310 to generate voltage outputs indicative of a presence of the magnetic field from the permanent magnet.

In one example, the rotor 306 and stator 308 of the motor device 300 may be configured such as that of a three-phase brushless motor. For instance, a three-phase motor having eight pole pairs may be used. As described above, the Hall-effect sensors 310 may be configured such that each Hall-effect sensor is coupled to a conductive coil of the stator. As the name suggests, Hall-effect sensors may be configured to provide outputs in response to detecting a magnetic field based on the Hall-effect. The Hall-effect refers to a voltage produced across an electrical conductor when charge carriers in the conductor move towards the sides of the conductor to balance out a magnetic influence from an external source. In the case of the motor device 300, the external source may be the permanent magnet on the rotor 306. Accordingly, a Hall-effect sensor may produce an output voltage in response to the rotor 306 moving by the Hall-effect sensor. In the case of the three-phase motor having eight pole pairs, the Hall-effect sensors 310 may be configured to generate outputs indicative of 3×8×2=48 motor positions.

While the implementation of the example motor device 300 includes Hall-effect sensors 310, other sensor types and configurations may be possible. For instance, instead of using sensors to detect a presence of the rotor 306, the conductive coils of the stator 308 may be tapped to acquire data indicating which conductive coils are active at a particular time. In this instance, referring back to FIG. 1A or 2A, the motor positions 100 and 200 may instead be representative of rotor positions calculated for each combination of activated conductive coil, as mentioned previously. In this case, analogous to the difference between motor positions 100 and 200, rotor positions representative of signal transitions for each unique combination of conductive coil activations may be evenly spaced if the conductive coils are evenly spaced, and unevenly spaced if the conductive coils are unevenly spaced.

In one example, the control circuit 302 may be configured to cause the rotor 306 to rotate by providing current to the conductive coils of the stator 308. In one case, the control circuit 302 may provide a sequence of electric currents to a combination of the conductive coils of the stator 308 to create a sequence of magnetic fields along the stator, causing the rotor 306 to rotate. The control circuit 302 may also be configured to receive outputs from the Hall-effect sensors 310, and determine the sequence of electric currents to provide to the conductive coils based on the received outputs. For instance, the outputs from the Hall-effect sensors 310 may indicate an initial position of the rotor 306 when the rotor 306 is not rotating, and the control circuit 302 may determine based on the initial position, which conductive coils to first provide electric currents to, to cause the rotor 306 to start rotating.

In one example, the memory 304 may be a non-transitory computer readable medium having program instructions stored thereon and executable by the processor 302 to control and coordinate functions of the motor device 300. In one case, the memory 304 may be configured to store a predetermined sequence for providing electric currents to the conductive coils, according to which the control circuit 302 may cause the rotor 306 to start and continue to rotate. In this case, the sequence may be predetermined during design of the motor device 300, and stored in the storage medium 304. The control circuit 302 may then retrieve the predetermined sequence from the storage medium when causing the rotor 306 to rotate. Example methods which may be embodied in the program instructions are further discussed below.

Figure 4:
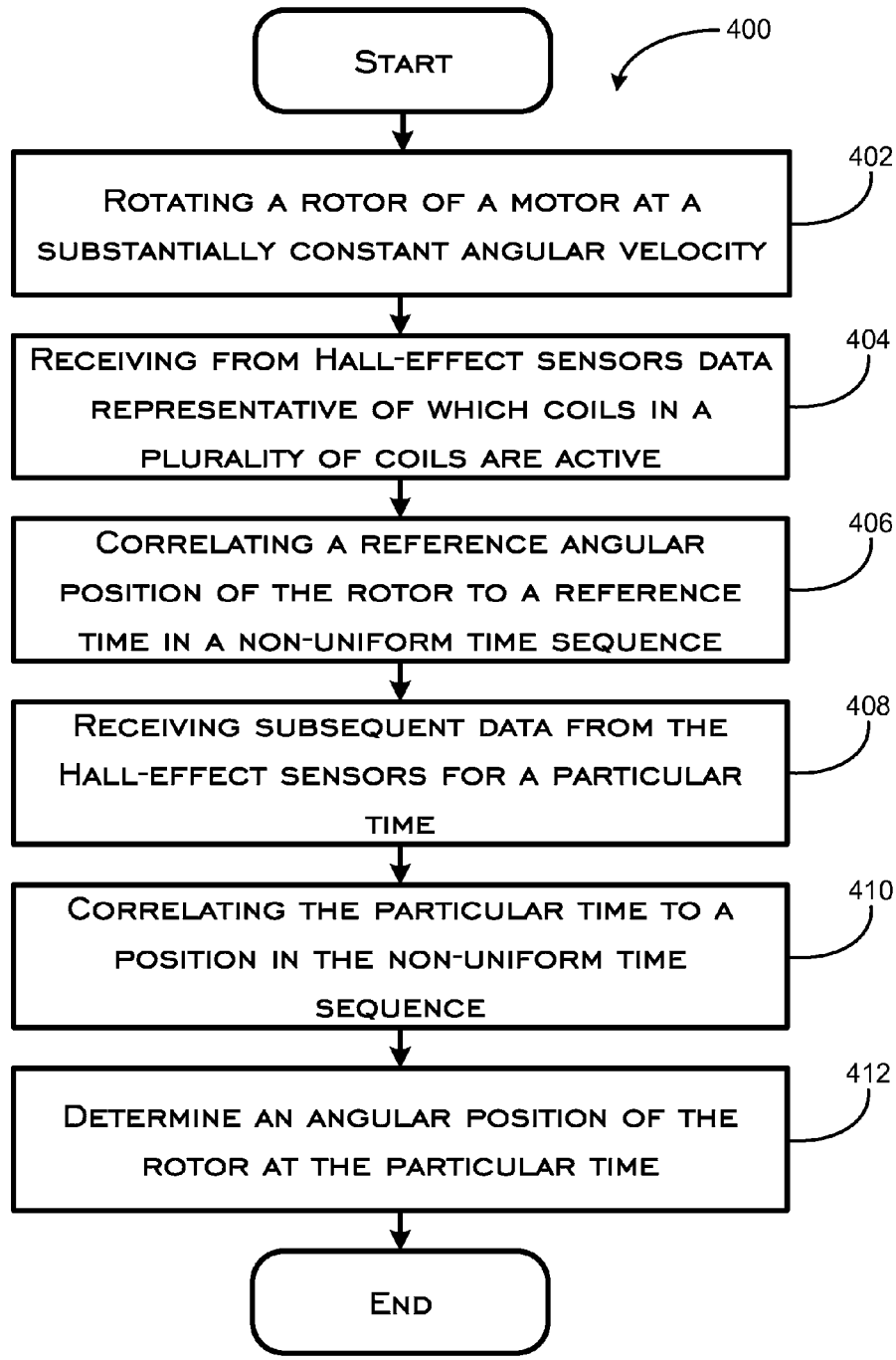
FIG. 4 is a flowchart depicting a method for dynamically detecting a position of a rotor in a motor, in accordance with an example embodiment.

FIG. 4 shows a flowchart depicting an example method 400 implemented on a motor device for dynamically determining a position of a rotor at a particular time during the rotation of the rotor in the motor device. Method 400 shown in FIG. 4 presents an embodiment of a method that could be implemented on the motor device 300 discussed above, and may be performed by a computing device, such as the control circuit 302 of FIG. 3.

Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor or electronic circuit such as the control circuit 302 for implementing specific logical functions or steps in the process.

The program code may be stored on the storage medium 304, or any type of computer readable medium such as, for example, a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At shown in FIG. 4, the method 400 includes block 402 for rotating a rotor of a motor at a substantially constant angular velocity, block 404 for receiving from Hall-effect sensors data representative of which coils in a plurality of coils are active, block 406 for correlating a reference angular position of the rotor to a reference time in a non-uniform time sequence, block 408 for receiving subsequent data from the Hall-effect sensors for a particular time, block 410 for correlating the particular time to a position in the non-uniform time sequence, and block 412 for determining an angular position of the rotor at the particular time.

In one respect, blocks 402, 404, and 406 may relate to a determination of a "fingerprint" of a motor, such as the motor device 300 of FIG. 3. In this respect, blocks 408, 410, and 412 may relate to determining a position of the rotor 306 at a particular time, based on the fingerprint of the motor device 300. In one example, blocks 402, 404, and 406 may be repeated as the rotor 306 continues to rotate. In other words, the fingerprint of the motor device 300 may be continuously updated as the motor device 300 operates. This way, potential changes in the fingerprint of the motor device 300 due to internal factors such as long term wear or frictional heat, or external factors such as humidity or temperature changes, may be accounted for when determining the position of the rotor 306 at the particular time.

At block 402, the method 400 may involve rotating a rotor 306 of a motor at a substantially constant angular velocity. As mentioned previously, rotating the rotor 306 of the motor device 300 may involve activating, or in other words, providing a sequence of electric currents to, combinations of the conductive coils of the stator 308 to generate varying magnetic fields between the permanent magnet of the rotor 306 and the respective combinations of activated conductive coils. The varying magnetic fields between the permanent magnet and the activated conductive coils may then translate to rotational torque, causing the rotor 306 to rotate.

In one case, the rotational torque due to the magnetic field between the permanent magnet of the rotor 306 and an activated conductive coil of the stator 308 may be stronger when the permanent magnet of the rotor 306 is closer to the activated conductive coil of the stator 308, and weaker when the permanent magnet of the rotor 306 is further from the activated conductive coil of the stator 308. As such, the rotational torque may vary as the rotor 306 moves from one conductive coil to another during rotation. Accordingly, the angular velocity of the rotor 306 may vary during rotation.

As previously mentioned, the motor device 300 may be installed on a LIDAR device such that the motor device 300 rotates a mirror to steer light that is transmitted to and received from objects in the environment. The rotor 306 may be coupled to the mirror to cause the mirror to rotate. The mirror may provide additional weight to the rotor 306, resulting in an increased angular momentum as the rotor 306 is rotating. As a result of the increased angular momentum, the angular velocity of the rotor 306 may vary less between conductive coils. Accordingly, once rotation of the rotor 306 is up to a desired rotational speed, or frequency, the angular velocity of the rotor 306 may be substantially constant. In such a LIDAR application, the rotational frequency of the rotor 306 may be in the range of 10-20 Hz, for example.

At block 404, the method 400 may involve receiving from Hall-effect sensors in the motor device data representative of which coils in the plurality of coils are active. As previously discussed, each of the plurality of Hall-effect sensors 310 may be coupled to one of the plurality of conductive coils spaced substantially equally apart along the stator 308 of the motor. Accordingly, during the substantially constant rotation of the rotor 306, outputs from each of the Hall-effect sensors 310 may be received as the rotor 306 rotates sequentially past each respective Hall-effect sensor. As such, a time sequence of signal transitions as represented by outputs from the Hall-effect sensors 310 may be generated.

In one example, if the motor device 300 was perfectly manufactured such that the conductive coils, and as a result, the Hall-effect sensors are spaced evenly apart, the time sequence may be similar to that of the time sequence 150 shown in FIG. 1B. In another example, if the motor device 300 is imperfect, the time sequence may include non-uniformly spaced signal transitions, reflective of non-uniform angular positions of the Hall-effect sensors and conductive coils, as is the case of the time sequence 250 shown in FIG. 2B.

As mentioned above, the conductive coils of the stator 208 may be tapped to receive data indicating which conductive coils are active at a particular time. In this case, the time sequence may include signal transitions calculated from different combinations of the plurality of conductive coils being activated, rather than outputs from the Hall-effect sensors 310. In this case, non-uniform angular positions of the conductive coils may accordingly provide a non-uniform time sequence as well.

While the time sequence 250 shown in FIG. 2B only shows signal transitions within a time frame of $t_0$ to $t_0+t_p$, the time sequence 250 may actually include signal transitions for any duration of time while the rotor 306 is rotating. In one case, once the rotor 306 is rotating at a substantially constant angular velocity with a rotational period of $t_p$, the time sequence 250 may appear as a sequence of substantially duplicative sets of signal transitions within each time frame of $t_p$. For example, the sequence of signal transitions between $t_0$ and $t_0+t_p$ may be substantially similar to the sequence of signal transitions between $t_0+t_p$ and $t_0+2t_p$.

As indicated previously, a non-uniform time sequence such as that of time sequence 250 shown in FIG. 2B may constitute a "fingerprint" of the motor device 300. In one example, the fingerprint may be defined by a time sequence of signal transitions within a time frame of $t_p$, which as described above, is the time taken for the rotor 306 to complete one rotation. As such, the fingerprint may be a time sequence of signal transitions for a full rotation of the rotor 306. In another example, the fingerprint may be an average time sequence of averaged signal transitions over multiple iterations of the time frame $t_p$. For instance, the first signal transitions of a first time frame $t_0$ to $t_0+t_p$, a second time frame $t_0+t_p$ to $t_0+2t_p$, and a third time frame $t_0+2t_p$ to $t_0+2t_p$ may be averaged to generate a first signal transition of the fingerprint time sequence. In either case, once determined, the fingerprint of the motor device 300 represented as a time sequence of signal transitions may be stored in the storage medium 304.

At block 406, the method 400 may involve correlating a reference angular position of the rotor 306 to a reference time $t_r$ in the non-uniform time sequence. In one example, the reference angular position may be based upon to provide an absolute angular value for the position of the rotor 306. In the case the fingerprint of the motor device 300 includes the time sequence 250 shown in FIG. 2B, the reference time $t_r$ in the non-uniform time sequence 250 may be $t_0$, and accordingly the fingerprint time sequence may be defined by signal transitions in the non-uniform time sequence 250 between $t_0$ and $t_0+t_1$. In one example, $t_r$ may be arbitrarily chosen in the non-uniform time sequence 250 so long as signal transitions are available in the time sequence up to $t_r+t_p$.

In this case, once a reference time $t_r$ has been determined, the reference time $t_0$ may be correlated to a reference angular position of the rotor 306 in the motor device 300. As discussed above, each signal transition in the time sequence 250 may correspond to a detection of the rotor 306 by one of the Hall-effect sensors 310. In an instance that the reference time $t_r$ is chosen such that $t_r$ corresponds to a signal transition, then the reference time $t_r$ may be correlated to the rotor 306 position corresponding to the respective signal transition. For instance, referring to FIGS. 2A and 2B, if a time of the signal transitions 252 is chosen as the reference time $t_r$, then the motor position 202 may be the reference angular position.

In another instance, if a reference time $t_r$ is chosen at a time half-way between two signal transitions, then the reference time $t_r$ may be correlated to an angular position halfway between motor positions corresponding to the two signal transitions. For instance, if $t_r$ is chosen as a time halfway between the signal transition 262 and signal transition 264, then the reference time $t_r$ may be correlated to the angular position 210 halfway between motor position 262 and motor position 264. As such, the angular position 201 may be determined as the reference angular position. The time sequence 250 of FIG. 2B reflects such a selection of $t_0$ as $t_r$.

Alternatively, the reference angular position may be identified first and a reference time in the time sequence may be subsequently associated with the identified reference angular position. For instance, in a LIDAR application, a LIDAR device may be configured to have a non-arbitrary, predetermined orientation for operation. In this instance, once the motor device 300 has been installed onto the LIDAR device, the reference angular position of the rotor 306 may be determined by aligning the predetermined orientation of the LIDAR device with an angular position of the rotor 306, and selecting the aligned angular position of the rotor 306 as the reference angular position. Referring to FIGS. 2A and 2B, if the predetermined orientation of the LIDAR device is aligned with the angular position 210, halfway between motor positions 212 and 214, then the time $t_0$, halfway between the signal transitions 264 and 262 may be selected as the reference time $t_r$. In one example, alignment of the predetermined orientation of the LIDAR device with an angular position of the rotor 306 may be performed with high precision and accuracy using laser alignment techniques, for example.

Whether the reference angular position is determined from a chosen reference time, or the reference time is determined from a chosen reference angular position, the reference angular position and the reference time, once chosen and determined, may be stored in the storage medium 304 along with the previously stored fingerprint of the motor device 300. In one example, calibration of the motor device 300 may be complete upon storage of the fingerprint time sequence, reference angular position, and reference time. In another example, as suggested previously, calibration of the motor device 300 may be continuously performed as the rotor 306 continues to rotate.

Continuous calibration of the motor device 300 may involve methods similar to the methods for the initial calibration of the motor device 300, discussed above in connection to block 402-406. As such, continuous calibration of the motor device 300 may involve receiving updated data from the Hall-effect sensors data representative of which coils in the plurality of coils are active during the substantially constant rotation of the rotor 306, correlating the reference angular position of the rotor 306 to an updated reference time in the updated non-uniform sequence, and refreshing the stored non-uniform time sequence based on the updated non-uniform time sequence. As with the cases discussed previously, the updated data from the Hall-effect sensors may have an updated non-uniform time sequence reflective of non-uniform angular positions of the coils.

Absent physical damage or significant changes in temperature or humidity, the updated non-uniform time sequence may be expected to be substantially similar to the initially determined footprint/non-uniform time sequence of the motor device 300. In one example, refreshing the stored non-uniform time sequence may involve calculating an average for each corresponding signal transition value in the time sequences. In one case, the non-uniform time sequence may be refreshed at each rotation of the rotor 306. In another case, the non-uniform time sequence may be refreshed periodically at an integral value number of rotations, such as every third or sixth rotation, for example.

As previously discussed, blocks 402, 404, and 406 may relate to a determination of a fingerprint of the motor device 300 of FIG. 3, and blocks 408, 410, and 412 may relate to determining a position of the rotor 306 at a particular time, based on the fingerprint of the motor device 300. At block 408, the method 400 may involve receiving subsequent data from the Hall-effect sensors indicating which coils are active at a particular time. In one example, data from the Hall-effect sensors 310 may continue to be received by the control circuit 302 as the rotor 306 continues to rotate at the substantially constant angular velocity, similar to block 404 described above. At block 404, however, data from the Hall-effect sensors 310 for at least a full rotation may be required for determining a footprint of the motor device 300. In the case of block 408, the subsequent data received from the Hall-effect sensors 310 may be processed to determine a location of the rotor 306 at the particular time, and may not require signal transitions for an entire rotation of the rotor 306.

In one case, the subsequent data from the Hall-effect sensors 310 may indicate which conductive coils are active at only the particular time. In another case, the subsequent data from the Hall-effect sensors 310 may include signal transitions within a time duration before the particular time. In one example, the time duration of the subsequent data may be determined based on a number of motor positions in the motor device 300 and an average time taken for the rotor 306 to move from one motor position to another such that at least one or at least two signal transitions are included in the subsequent data, for example. In one respect, the subsequent data from the Hall-effect sensors at the particular time may provide a "snapshot" of which coils are active at the particular time, or are active between the particular time and a time duration before the particular time. Because the signal transitions of the subsequent data are determined based on outputs from the same Hall-effects sensors as the signal transitions of the non-uniform fingerprint time sequence, the signal transitions of the subsequent data may substantially match a subset of continuous signal transitions in the non-uniform fingerprint time sequence.

At block 410, the method 400 may involve correlating the particular time to a position in the non-uniform time sequence. In one example, correlating the particular time to a position of in the non-uniform time sequence may involve determining a match between the subsequent data at the particular time and signal transitions at a position, or time, in the non-uniform time sequence. In one case, determining a match between the subsequent data at the particular time and a time in the non-uniform time sequence may involve pattern matching between signal transitions in the time duration up until the particular time and signal transitions in the non-uniform time sequence, or fingerprint of the motor device 300. Due to the non-uniform quality of the time sequence of an imperfect motor, such as the motor device 300, a single, best match may be determined between the signal transitions of the subsequent data and signal transitions in the non-uniform time sequence. For instance, referring to FIG. 2B, only one subset of three consecutive signal transitions may exist having signal values, and times between signal transitions matching that of signal transitions 252, 254, and 256.

In contrast, a perfectly manufactured motor device, as described above in connection to FIGS. 1A and 1B, may have a fingerprint including a uniform time sequence of signal transitions. In this case, pattern matching signal transitions between the subsequent data and the uniform time sequence may result in multiple matches because any signal transition in the uniform time sequence may match the one or more signal transitions in the subsequent data.

Once a position in the non-uniform fingerprint time sequence has been matched to particular time, block 412 may involve determining an angular position of the rotor at the particular time. In one example, determining an angular position of the rotor 306 at the particular time may involve correlating the particular time to a position of the rotor 306 based on the correlated position in the non-uniform time sequence. For example, referring to FIGS. 2A and 2B, if the particular time is matched to time $t_0+t_1$ in the non-uniform fingerprint time sequence, then the particular time may be correlated to the position 208 because the position 208 correlates to the time $t_0+t_1$ in the non-uniform fingerprint time sequence.

In some cases, the particular time may be matched to a time in the non-uniform fingerprint time sequence when a signal transition occurs. In such cases, the position of the rotor 306 correlated to the particular time may be that of one of the motor positions 200. For instance, referring to FIGS. 2A and 2B, the particular time is matched to a time when signal transition 256 occurs in the time sequence 250, then the particular time may be correlated to the motor position 206, indicating that the rotor 306 may be at the position of the motor position 206 at the particular time.

In other cases, the particular time may be matched to a time somewhere between signal transitions in the non-uniform fingerprint time sequence. In such cases, the position of the rotor 306 may be interpolated between two motor positions based on where the matched time in the non-uniform fingerprint time sequence is between two signal transitions. Referring again to FIGS. 2A and 2B, if the particular time is matched to the time $t_0+t_1$, which may be three quarters of the way between when the signal transition 252 occurs and when the signal transition 254 occurs in the time sequence 250, the position of the rotor 306 at the particular time may be interpolated as being three quarters of the way between motor position 202 corresponding to the signal transition 252, and motor position 204, corresponding to signal transition 254. As shown in FIG. 2A, the rotor may be at position 208.

As mentioned previously in connection to block 406, a reference position of the motor device 300 may be correlated to a reference time in the fingerprint time sequence 250 to provide an absolute angular value for the position of the rotor 306. Accordingly, an angular value representative of the determined angular position may be provided for the position of the rotor 306 at the particular time, relative to the reference position. In one example, the position in the fingerprint time sequence 250 correlated to the particular time may be $t_0+t_1$, as described above, and accordingly the position 208 may correlate the particular time. In one case $t_0$, which is half way between signal transitions 264 and 262, may be determined as the reference time. As shown in FIGS. 2A and 2B, $t_0$ may correspond to position 210, which is half way between motor positions 212 and 214. As such, the position 210 may be the reference position. In one respect, a relative time in the time sequence 250 of $(t_0+t_1)-t_0=t_1$ may reflect the angular value of the rotor. In another respect, an angular value may be calculated as the angle between position 210 and position 208, which as shown in FIG. 2A may be three quarters of the way between motor positions 202 and 204.

Figure 5:
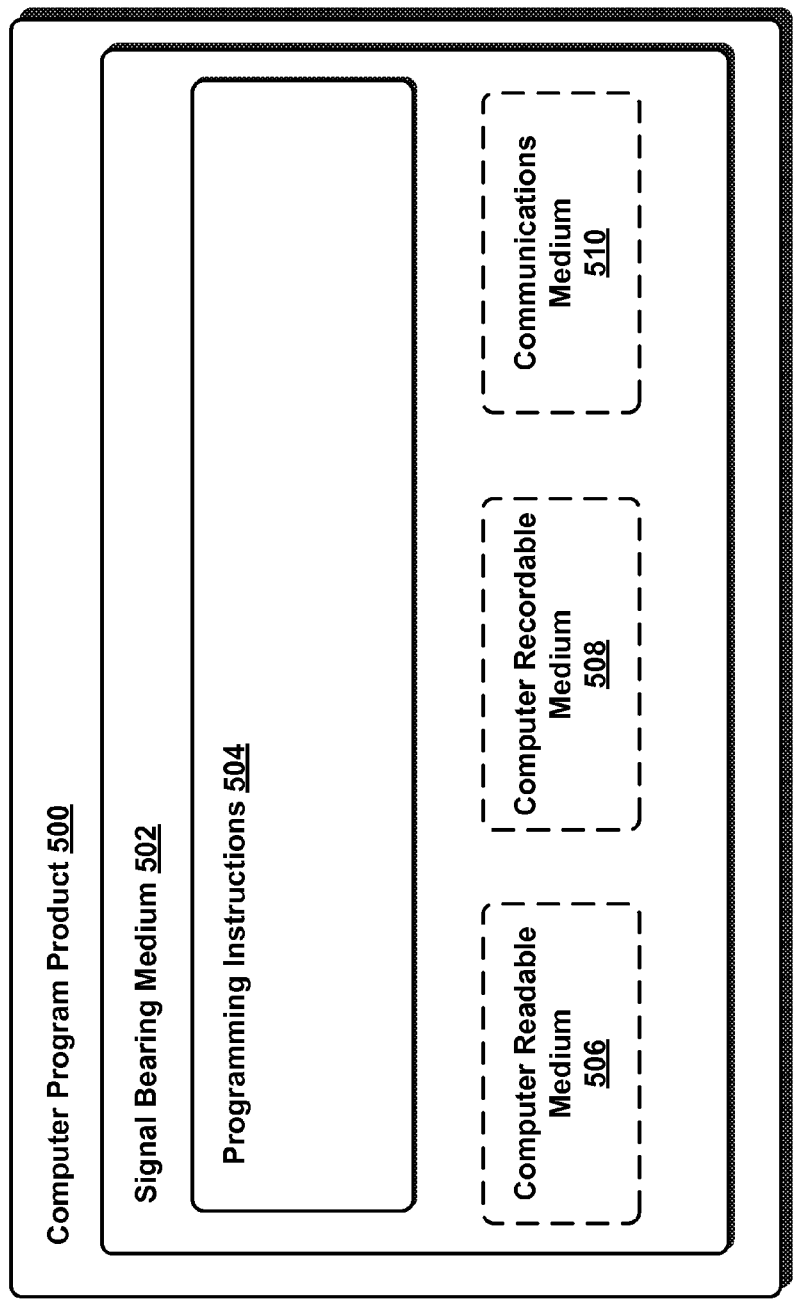
FIG. 5 is a computer-readable medium, in accordance with an example embodiment.

As indicated above, in some embodiments, the disclosed methods may be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 may be provided using a signal bearing medium 502. The signal bearing medium 502 may include one or more programming instructions 504 that, when executed by one or more processors may provide functionality or portions of the functionality described with respect to FIG. 4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a processing unit such as a part of the control circuit 302 of the motor device 300 in FIG. 3 may be configured to provide various operations, functions, or actions in response to the programming instructions 504 conveyed to the processing unit by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a computing device such as any of those described above. Alternatively, the computing device that executes some or all of the stored instructions could be another computing device, such as a server.

While various aspects and embodiments have been disclosed herein, it should be understood that the embodiments are example embodiments and are described in connection to just some of many possible applications. Accordingly, it should also be understood that other aspects and embodiments are also possible. The various aspects and embodiments disclosed herein are for purposes of illustration and are not intended to be limiting, with the true scope and spirit being indicated by the following claims.

We claim:

1. A method comprising:
   rotating a rotor of a motor at a substantially constant angular velocity, wherein the motor includes a plurality of coils and a plurality of sensors;
   receiving from the sensors data representative of which coils in the plurality of coils are active during the substantially constant rotation of the rotor, wherein the data from the sensors has a non-uniform time sequence reflective of non-uniform angular positions of the coils;
   correlating a reference angular position of the rotor to a reference time in the non-uniform time sequence;
   receiving subsequent data from the sensors, wherein the subsequent data includes data representative of which coils are active at a particular time;
   correlating the particular time to a position in the non-uniform time sequence based on the subsequent data; and
   determining an angular position of the rotor at the particular time based on the position in the non-uniform time sequence relative to the reference time.

2. The method of claim 1, wherein the non-uniform time sequence comprises a plurality of signal transitions, and wherein each signal transition in the non-uniform time sequence corresponds to a particular combination of active coils in the plurality of coils.

3. The method of claim 2, wherein correlating the particular time to a position in the non-uniform time sequence based on the subsequent data comprises:
  interpolating the position in the non-uniform time sequence between two adjacent signal transitions based on the subsequent data.

4. The method of claim 1, further comprising:
  storing the non-uniform time sequence and the reference angular position of the rotor.

5. The method of claim 4, further comprising:
  receiving updated data from the sensors data representative of which coils in the plurality of coils are active during the substantially constant rotation of the rotor, wherein the updated data from the sensors has an updated non-uniform time sequence reflective of non-uniform angular positions of the coils;
  correlating the reference angular position of the rotor to an updated reference time in the updated non-uniform sequence; and
  refreshing the stored non-uniform time sequence based on the updated non-uniform time sequence.

6. The method of claim 1, wherein the rotor is coupled to a mirror, and wherein the determined angular position of the rotor indicates an angle of the mirror for a light detection and ranging (LIDAR) application.

7. The method of claim 1, wherein the motor is a three-phase brushless motor.

8. The method of claim 1, wherein the sensors are Hall-effect sensors.

9. A device comprising:
  a motor comprising a rotor, a plurality of coils, and a plurality of sensors; and
  an electronic circuit configured to:
    rotate the rotor at a substantially constant angular velocity;
    receive from the sensors data representative of which coils in the plurality of coils are active during the substantially constant rotation of the rotor, wherein the data from the sensors has a non-uniform time sequence reflective of non-uniform angular positions of the coils;
    correlate a reference angular position of the rotor to a reference time in the non-uniform time sequence;
    receive subsequent data from the sensors, wherein the subsequent data includes data representative of which coils are active at a particular time;
    correlate the particular time to a position in the non-uniform time sequence based on the subsequent data; and
    determine an angular position of the rotor at the particular time based on the position in the non-uniform time sequence relative to the reference time.

10. The device of claim 9, wherein the non-uniform time sequence comprises a plurality of signal transitions, and wherein each signal transition in the non-uniform time sequence corresponds to a particular combination of active coils in the plurality of coils.

11. The device of claim 10, wherein the electronic circuit is further configured to correlate the particular time to a position in the non-uniform time sequence based on the subsequent data by:
  interpolating the position in the non-uniform time sequence between two adjacent signal transitions based on the subsequent data.

12. The device of claim 9, wherein the electronic circuit is further configured to:
  store the non-uniform time sequence and the reference angular position of the rotor.

13. The device of claim 12, wherein the electronic circuit is further configured to:
  receive updated data from the sensors data representative of which coils in the plurality of coils are active during the substantially constant rotation of the rotor, wherein the updated data from the sensors has an updated non-uniform time sequence reflective of non-uniform angular positions of the coils;
  correlate the reference angular position of the rotor to an updated reference time in the updated non-uniform sequence; and
  refresh the stored non-uniform time sequence based on the updated non-uniform time sequence.

14. The device of claim 9, wherein the rotor is coupled to a mirror, and wherein the determined angular position of the rotor indicates an angle of the mirror for a light detection and ranging (LIDAR) application.

15. The motor of claim 9, wherein the sensors are Hall-effect sensors.

16. A non-transitory computer readable medium having stored thereon instructions executable by a computing device to cause the computing device to perform functions comprising:
  rotating a rotor of a motor at a substantially constant angular velocity, wherein the motor includes a plurality of coils and a plurality of Hall-effect sensors;
  receiving from the Hall-effect sensors data representative of which coils in the plurality of coils are active during the substantially constant rotation of the rotor, wherein the data from the Hall-effect sensors has a non-uniform time sequence reflective of non-uniform angular positions of the coils;
  correlating a reference angular position of the rotor to a reference time in the non-uniform time sequence;
  receiving subsequent data from the Hall-effect sensors, wherein the subsequent data includes data representative of which coils are active at a particular time;
  correlating the particular time to a position in the non-uniform time sequence based on the subsequent data; and
  determining an angular position of the rotor at the particular time based on the position in the non-uniform time sequence relative to the reference time.

17. The non-transitory computer readable medium of claim 16, wherein the non-uniform time sequence comprises a plurality of signal transitions, and wherein each signal transition in the non-uniform time sequence corresponds to a particular combination of active coils in the plurality of coils.

18. The non-transitory computer readable medium of claim 17, wherein the functions further comprise:
  interpolating the position in the non-uniform time sequence between two adjacent signal transitions based on the subsequent data.

19. The non-transitory computer readable medium of claim 16, wherein the functions further comprise:
  storing the non-uniform time sequence and the reference angular position of the rotor.

20. The non-transitory computer readable medium of claim 19, wherein the functions further comprise:
  receiving updated data from the Hall-effect sensors data representative of which coils in the plurality of coils are active during the substantially constant rotation of the rotor, wherein the updated data from the Hall-effect sensors has an updated non-uniform time sequence reflective of non-uniform angular positions of the coils;

correlating the reference angular position of the rotor to an updated reference time in the updated non-uniform sequence; and refreshing the stored non-uniform time sequence based on the updated non-uniform time sequence.

\* \* \* \* \*